United States Patent [19]
Phillips, Jr.

[11] Patent Number: 5,756,619
[45] Date of Patent: May 26, 1998

[54] METHOD FOR EMULSION POLYMERIZATION

[75] Inventor: Claude Frank Phillips, Jr., Panama City, Fla.

[73] Assignee: Arizona Chemical Company, Panama City, Fla.

[21] Appl. No.: 463,292

[22] Filed: Jun. 5, 1995

Related U.S. Application Data

[62] Division of Ser. No. 233,351, Apr. 26, 1994, abandoned.

[51] Int. Cl.$^6$ ............................................. C08F 2/26
[52] U.S. Cl. ................................... 526/213; 526/94
[58] Field of Search ........................ 526/213, 216, 526/94

[56] References Cited

FOREIGN PATENT DOCUMENTS 625572   6/1949   United Kingdom.
659847   10/1951  United Kingdom.

OTHER PUBLICATIONS

Zinkel, Duane F. and James Russell, "Other Uses of Fatty Acids", *Naval Stores*, Pulp Chemical Association, Inc., 1980.

Arizona Chemical Company. SYLFAT D-1, Data Sheet, Aug. 1988.

Semon, W.L., "The Use of Fatty Acids of Their Soaps in the Manufacture of Butadiene Synthetic Rubber", *The Journal of the American Oil Chemists' Society*, Feb. 1947.

Wilson, J.W., and E.S. Pfau, "Soap Ingredients as Retarders in Butadiene–Styrene Copolymerization", *Industrial and Engineering Chemistry*, vol. 40, No. 3, Mar. 1948.

*Primary Examiner*—Christopher Henderson
*Attorney, Agent, or Firm*—Luedeka, Neely & Graham, P.C.

[57] ABSTRACT

The specification discloses an emulsifier for use in preparing olefinic polymers by emulsion polymerization which comprises a mixture of alkali metal salts of unsaturated branched chain isomers of fatty acids characterized by a relatively low concentration of di- and poly-unsaturated fatty acids. The unsaturated branched chain isomers of fatty acids are preferably provided by the monomeric distillate fraction from the dimerization of the unsaturated fatty acid fraction of tall oil, and the alkali metal is preferably selected from the group consisting of sodium and potassium. The disclosure also describes a polymerization emulsion for use in the polymerization of olefinic monomers and a method for polymerizing olefinic monomeric compounds employing an emulsifier which comprises the saponified monomeric distillate fraction from the dimerization of unsaturated fatty acids.

9 Claims, 1 Drawing Sheet ized according to the following detailed description of exemplary embodiments in conjunction with the accompanying drawings in which:

METHOD FOR EMULSION POLYMERIZATION

This is a division of application Ser. No. 08/233,351, filed Apr. 26, 1994, now abandoned.

FIELD OF THE INVENTION

The present invention relates to emulsifiers and methods for the emulsion polymerization of organic monomeric compounds. More particularly, the present invention relates to the emulsion polymerization of olefinic monomers.

BACKGROUND OF THE INVENTION

The polymerization of organic monomers, such as olefins, is of major commercial importance to chemical industries. In general, monomeric units, such as ethylene, are joined together in a polymerization reaction to form a polymer, such as polyethylene, which is a chain of repeating ethylene groups.

In an emulsion polymerization system, a monomer or mixture of monomers is combined with an emulsifying agent, an activator and water. The emulsifier is an important component of the system, serving to disperse the monomer while facilitating in providing sites for generation of free radicals to promote the polymerization reactions. The product of emulsification polymerization is often referred to as a latex.

In the production of styrene-butadiene rubber (SBR) by emulsion polymerization, sodium or potassium soaps of fatty acids have been used as emulsifiers. Acidification of the final latex simultaneously destroys the emulsifying agent and deposits free fatty acid in the coagulum, where it is a valuable adjunct to the sulfur cross-linking reaction used later for vulcanization.

The alkali metal salt of partially hydrogenated tallow fatty acid (HTFA) is widely used as an emulsifying agent in emulsion polymerization reactions employing olefinic monomers, such as in the production of SBR latexes. Since HTFA is derived from vegetable oils, the price of HTFA fluctuates with the price of vegetable oils, and is therefore unstable. It is desired that an emulsifying agent be developed which is at least as effective as HTFA without the economic uncertainty of price fluctuations associated with HTFA.

It is therefore an object of the invention to provide an emulsifying agent for emulsion polymerization reactions, and particularly the emulsification polymerization of olefins.

It is a further object of the present invention to provide an emulsifier for emulsion polymerization employing an emulsifying agent which is not subject to market price fluctuations.

Another object of the invention is to provide an emulsifying agent for emulsion polymerization which may be used in place of HTFA while providing at least substantially equivalent performance.

An additional an object of the invention is to provide a method for the emulsion polymerization of olefinic compositions using an emulsifying agent which is relatively inexpensive, readily available and convenient to produce and use.

SUMMARY OF THE INVENTION

Having regard to the above and other objects and advantages, the present invention relates to an emulsifier for use in producing olefinic polymers by emulsion polymerization. According to one aspect of the invention, the emulsifier comprises a saponified complex mixture of fatty acids consisting substantially of branched chain isomers of unsaturated fatty acids, characterized by a relatively low concentration of di- and poly-unsaturated fatty acids. The emulsifier may be a mixture of alkali metal salts of such unsaturated branched chain isomers of fatty acids. The alkali metal is preferably sodium or potassium. The unsaturated branched chain isomers of fatty acids preferably have from 16 to 18 carbon atoms, a boiling point range of from about 280° C. to about 290° C. at a pressure in the range of from about 1 mm to about 2 mm of mercury, an acid value in the range of from about 150 to about 200 and an iodine value in the range of from about 50 to about 90.

According to another aspect of the invention, an emulsifier for polymerization reactions is obtained by saponifying the monomeric distillate from the dimerization of a fatty acid, which in a preferred embodiment is obtained by reacting sodium or potassium hydroxide with the monomeric distillate fraction from the dimerization of the unsaturated fatty acid fraction of tall oil, which fraction includes as its principal components oleic and linoleic acids. Currently, the monomeric distillate of the dimerization reaction is sold for further hydrogenation to form isostearic acid. The purchasers of the distillate separate the fractions after hydrogenation to produce this liquid saturated fatty acid. Isostearic acid is widely used in 2-cycle motor oil. The monomeric distillate is also currently used in blends for phosphate ore recovery. The invention provides an additional useful application for this distillate of dimerization by combination with an alkali metal to form an emulsifier which is readily available in stable supply to replace the more economically unreliable conventional HTFA emulsifier.

The present invention also relates to an emulsion for use in the polymerization of olefinic monomers. The emulsion comprises at least one olefinic monomer, a mixture of saponified unsaturated branched chain isomers of fatty acids characterized by a relatively low concentration of di- and poly-unsaturated fatty acids, preferably provided by the saponified monomeric distillate of the dimerization of tall oil fatty acids, an activator and water. Preferably, the olefinic monomer is selected from the group consisting of (but not limited to) styrene, butadiene, acrylonitrile, vinyl pyridine, chloroprene, mixtures of styrene and butadiene, mixtures of acrylonitrile, styrene and butadiene, and mixtures of vinyl pyridine, styrene and butadiene.

The present invention further relates to a method for polymerizing olefinic monomeric compounds. The method includes the steps of, first, combining in a mixture one or more olefinic monomeric compounds, a mixture of saponified unsaturated branched chain isomers of fatty acids characterized by a relatively low concentration of di- and poly-unsaturated fatty acids, preferably provided by the saponified monomeric distillate of the dimerization of tall oil fatty acids, an activator, and water to a reaction vessel thereby forming a reaction blend. Then, the reaction blend is mixed to form a reaction emulsion. The reaction emulsion is processed to provide a polymer of the olefinic composition as desired.

BRIEF DESCRIPTION OF THE DRAWINGS

The above and other features and advantages of the invention will now become further illustrated in the following detailed description of exemplary embodiments in conjunction with the accompanying drawings in which.

DETAIL DESCRIPTION OF THE INVENTION

Figure 1:
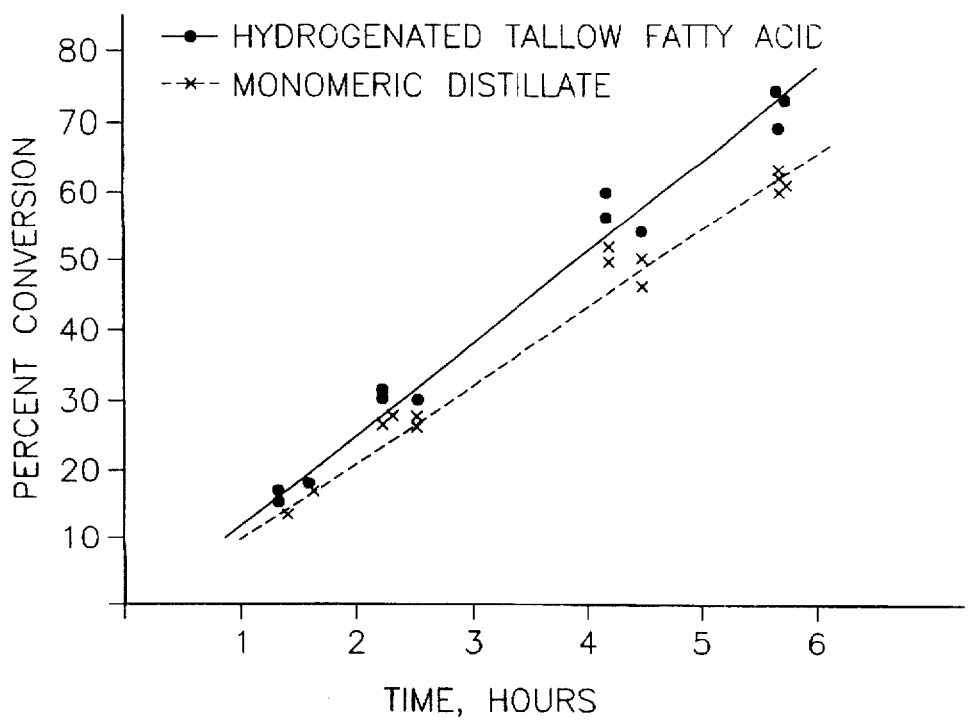
FIG. 1 is a graphical representation illustrating the percent conversion of styrene and butadiene monomers to a styrene-butadiene polymer for a prior art emulsion polymerization process versus time as compared to a styrene-butadiene polymer produced using one embodiment of an emulsion polymerization process according to the invention.

The invention provides an improved emulsifying agent, emulsion and method for emulsion polymerization reactions. According to one aspect of the invention, the emulsifying agent includes a mixture of alkali metal salts of unsaturated branched chain isomers of fatty acids, characterized by a relatively low concentration of di- and poly-unsaturated fatty acids.

The unsaturated branched chain isomers of fatty acids are advantageously derived from the monomeric residue which is distilled off the dimerization reaction of the unsaturated fatty acid fraction of tall oil. The monomeric residue is believed to be primarily composed of a mixture of mainly $C_{18}$ monounsaturated fatty acids which are randomly branched isomers having the single double bond located at random positions in the molecules. It is to be noted that the emulsifier according to the invention derived from tall oil fatty acids would not have been expected to be an effective emulsifier for emulsion polymerization due to the high linoleic/conjugated fatty acid content of the tall oil. These compounds are known to interfere with, rather than promote, emulsion polymerization processes and, thus, have been avoided in the past. In the dimerization process, the linoleic and conjugated fatty acids are converted to dimer fatty acids. In particular, the fatty acid fraction of tall oil (TOFA) is mixed in a dimerization process with a naturally occurring bentonite, montmorillonite clay, classified by Chemical Abstracts Number (CAS#) 1302-78-9. The reaction mixture is held at a temperature in the range of from about 200° C. to about 260° C., under steam pressure in the range of from about 3.4 atm. to about 6.8 atm., for about 4 hours. After the reaction is substantially complete, the clay is filtered out leaving a reaction product comprising unreacted monomeric material (about 30 to 40% of the original TOFA) and dimeric/trimeric fatty acid material. The monomeric material is distilled off at from about 280° C. to about 290° C. under vacuum of from about 1 mm to about 2 mm of mercury to give the monomeric material as a distillate with the dimeric/trimeric fatty acids remaining as bottoms. In the past, the monomeric distillate has generally been hydrogenated to produce isostearic acid.

Without being bound by any theory, it is believed that in the acidic environment on the surface of the clay in the dimerization process, the original straight chain naturally occurring fatty acids, mostly $C_{16}$ and $C_{18}$ chain length fatty acids, are rearranged to the iso or branched chain acids. It is now believed that these iso- or branched chain fatty acids exhibit a relatively high degree of monounsaturated acids with a relatively small percentage of di- or poly- unsaturated fatty acids. It is believed that a typical monomer distillate would contain less than about 5% di- or poly- unsaturated species. Thus, contrary to expectations, the monomer mixture from dimerization of tall oil fatty acids, when saponified, provides an emulsifier which does not significantly interfere with the emulsion polymerization process and, in fact, enables yields which compare favorably with other widely used emulsifiers such as HTFA.

In the production of emulsifiers according to the present invention, the monomeric distillate material is saponified with an alkali salt such as sodium hydroxide or potassium hydroxide. On a laboratory scale, for example, a potassium hydroxide stock solution is prepared in the proportions 125 g potassium hydroxide pellets (or 280 g of 45% liquid grade potassium hydroxide), 1.2 g tetra sodium salt of EDTA (ethylene diamine tetraacetic acid), and 20 g potassium chloride into 1500 g distilled water. Monomeric distillate, 15 g, is weighed into a 250 ml Erlenmeyer flask. Hot distilled water, 40 g, is added to the flask followed by 30 ml of the potassium hydroxide stock solution. The mixture is heated to boiling until the monomeric distillate is completely dissolved. The mixture is then cooled under nitrogen for use in emulsion polymerization.

The emulsifying agent (i.e., the saponified monomeric distillate) is then mixed with an olefinic monomer in a reactor along with an activator system and water. Suitable activator systems include those systems which generate free radicals such as by the decomposition of peroxides or diazo compounds. Another suitable activator system includes oxidation-reduction reactions (redox couples).

Although the emulsifier of the present invention is believed to be useful for a wide range of emulsification polymerization reactions, in the case of olefinic monomers such as styrene and butadiene and mixtures of these, a preferred emulsion is prepared from a mixture of from about 30 to about 40 wt. % monomer, from about 1 to about 3 wt. % emulsifier, from about 0.02 to about 0.06 wt. % activator and from about 55 to about 65 wt. % water, all on the basis of the total weight of the emulsion. The water is preferably added first, followed by the emulsifier and then the monomer. The components are thoroughly mixed and the activator is added slowly while mixing. The entire mixture is then blended at a temperature in the range of from about 0° C. to about 100° C., and preferably from about 5° to about 50° C., for from about 1 to about 20 hour, typically from about 8 to about 12 hours. The polymerization reaction advances during this time until a homogeneous latex is formed, typically containing from about 60 to about 70 wt. % polymer (i.e., from about 21–25% solids) in a fine suspension with from about 30 to about 40 wt. % unreacted monomer and other non-polymeric compounds which may be retained or removed depending on the end-use.

The resulting latex is a relatively stable composition at room temperature, and in the case of a styrene-butadiene polymer will typically have a milk-like color with a low viscosity.

Thus, the present invention provides an emulsifier, emulsion and emulsion polymerization method for the polymerization of olefinic compounds. These accomplishments are advantageously realized through the use of a monomeric distillate of the dimerization reaction of tall oil fatty acid. This material has the advantage that it is readily available from current wood sources, and is not generally subject to the market price fluctuations of vegetable oil-derived emulsifying agents.

It is believed that monomeric distillates from dimerizing other materials may also be useful as emulsifiers according to the invention. For example, monomeric distillates from dimerization of fatty acids of vegetable or animal oils or from general refining processes and containing significant quantities of branched chain monounsaturated isomers may be used. In addition, it is believed that the emulsifiers of the invention may be used in many emulsion polymerization processes in addition to SBR latexes such as in the production of ABS, polychloroprene and vinyl pyridine, to name a few.

The following nonlimiting examples further illustrate various aspects of the invention.

EXAMPLE I

Figure 2:
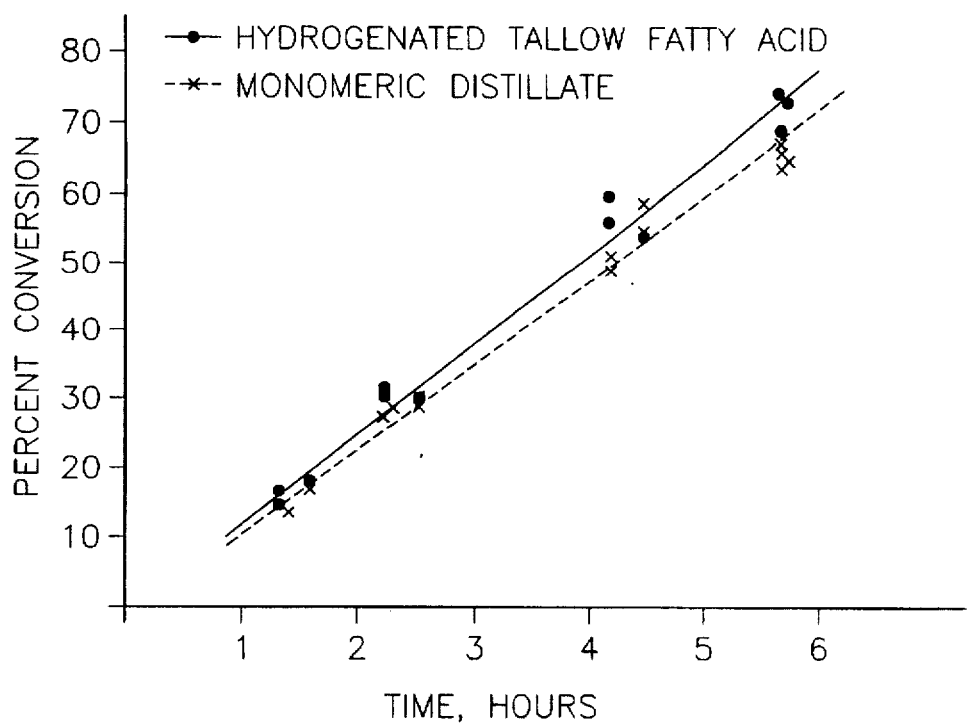
FIG. 2 is a graphical representation illustrating the percent conversion of styrene and butadiene monomers to styrene-butadiene polymer for a prior art emulsion polymerization process versus time as compared to a styrene-butadiene polymer produced using another embodiment of an emulsion polymerization process according to the invention.

Three 6.5 oz bottles were each charged with 8.7 g of styrene, 20.1 g of freshly distilled butadiene, 0.05 g of tert-dodecyl mercaptan and 0.01 g of para-menthane hydroperoxide. An emulsifying agent solution was prepared for each bottle with 1.15 g of partially hydrogenated tallow fatty acid (HTFA), 0.22 g of potassium hydroxide, 0.002 g of the tetrasodium salt of ethylenediaminetetra acetic acid ($Na_4EDTA$), 0.08 g of potassium chloride, 0.03 g of an anionic surfactant (TAMOL SN, Rohm and Haas), and 50 g of water. The emulsifying agent solution was added, excluding air, to each of the 6.5 oz bottles. An activator, consisting of 0.01 g of sodium formaldehyde sulfoxylate, 0.003 g of ferrous sulfate, 0.02 g of $Na_4EDTA$, and 2.5 g of water, was then added, excluding air, to each of the 6.5 oz bottles. The bottles were then placed in a bottle bath and held at 5° C., with agitation, during the period of reaction. The bottles were sampled periodically via syringe. The volatiles were driven off the samples and the percent conversion of the monomeric styrene and butadiene to a styrene-butadiene polymer was determined. The percent conversion was then plotted as a function of time as is shown in FIGS. 1 and 2. The control emulsion is indicated as filled circles on FIGS. 1 and 2.

EXAMPLE II

Four 6.5 oz bottles were charged with 8.7 g of styrene, 20.1 g of freshly distilled butadiene, 0.05 g of tert-dodecyl mercaptan, and 0.01 g of para-menthane hydroperoxide each. An emulsifying agent solution was prepared for each bottle consisting of 1.15 g of the distillate of the dimerization reaction of tall oil fatty acid (SYLFAT D1®, Arizona Chemical Company), 0.22 g of potassium hydroxide, 0.002 g of the tetrasodium salt of ethylenediaminetetra acetic acid ($Na_4EDTA$), 0.08 g of potassium chloride, 0.03 g of an anionic surfactant (TAMOL SN, Rohm and Haas), and 50 g of water. The emulsifying agent solution was added, excluding air, to each of the 6.5 oz bottles. An activator, consisting of 0.01 g of sodium formaldehyde sulfoxylate, 0.003 g of ferrous sulfate, 0.02 g of $Na_4EDTA$, and 2.5 g of water, was then added, excluding air, to each of the 6.5 oz bottles. The bottles were then placed in a bottle bath and held at 5° C., with agitation, during the period of reaction. The bottles were sampled periodically via syringe. The volatiles were driven off the samples and the percent conversion of the monomeric styrene and butadiene to a styrene-butadiene polymer was determined. The percent conversion was then plotted as a function of time as is shown in FIG. 1. The emulsion prepared according to the present invention is indicated as X's on FIG. 1.

As is shown in FIG. 1, the amount of monomer converted to polymer with the distillate as an emulsifying agent compares favorably with the conversion rate using the HTFA as an emulsifying agent.

EXAMPLE III

Four 6.5 oz bottles were charged with 8.7 g of styrene, 20.1 g of freshly distilled butadiene, 0.05 g of tert-dodecyl mercaptan, and 0.01 g of para-menthane hydroperoxide each. An emulsifying agent solution was prepared for each bottle using 1.34 g of the distillate of the dimerization reaction of tall oil fatty acid (SYLFAT D1, Arizona Chemical Company), 0.22 g of potassium hydroxide, 0.002 g of the tetrasodium salt of ethylenediamine-tetra acetic acid ($Na_4EDTA$), 0.08 g of potassium chloride, 0.03 g of an anionic surfactant (TAMOL SN, Rohm and Haas), and 50 g of water. The amount of distillate was increased to compensate for the lowered acid value of the distillate (acid number of 175) when compared with the HTFA (acid number of 204). Therefore, 204/175=1.17 times as much distillate was used in this Example as was used in Example II (1.34 g of distillate here compared with 1.15 g of distillate used in Example II). The emulsifying agent solution was added, excluding air, to each of the 6.5 oz bottles. An activator, consisting of 0.01 g of sodium formaldehyde sulfoxylate, 0.003 g of ferrous sulfate, 0.02 g of $Na_4EDTA$, and 2.5 g of water, was then added, excluding air, to each of the 6.5 oz bottles. The bottles were then placed in a bottle bath and held at 5° C., with agitation, during the period of reaction. The bottles were sampled periodically via syringe. The volatiles were driven off the samples and the percent conversion of the monomeric styrene and butadiene to a styrene-butadiene polymer was determined. The percent conversion was then plotted as a function of time as is shown in FIG. 2. The emulsion prepared according to the present invention is indicated as X's on FIG. 2.

As is shown in FIG. 2, the rate of conversion of the monomeric materials to polymers using the monomeric distillate of the residue of the dimerization of tall oil fatty acid compares very favorably with the hTFA.

Although various embodiments and features of the invention have been described in the foregoing detailed description, those of ordinary skill will recognize that the invention may be capable of numerous modifications, rearrangements and substitutions without departing from the scope of the invention as set forth in the appended claims.

What is claimed is:

1. A method for polymerizing at least one olefinic monomeric compound comprising combining the olefinic monomeric compound with an activator, water and a mixture comprising sodium or potassium salts of a monomeric distillate fraction from the clay catalyzed dimerization of tall oil fatty acids, said distillate fraction containing a substantial amount of branched chain fatty acids characterized by a relatively low concentration of di- and poly- unsaturated fatty acids and which contain from 16 to 18 carbon atoms, thereby forming a reaction blend, mixing the reaction blend to provide a reaction emulsion, reacting the reaction emulsion to cause a polymerization of the monomer to a polymer latex, and recovering the polymer latex, wherein the reaction mixture contains from about 30 to about 40% by weight olefinic monomer, from about 1 to about 3% by weight of the fatty acid salts, from about 0.02 to about 0.06% by weight activator and from about 55 to about 65% by weight water.

2. The method of claim 1 wherein the olefinic monomeric compound is selected from the group consisting of styrene, butadiene, acrylonitrile, vinyl pyridine, chloroprene, mixtures of styrene and butadiene, mixtures of acrylonitrile, styrene and butadiene, and mixtures of vinyl pyridine, styrene and butadiene.

3. The method of claim 1 wherein the branched chain fatty acids have a boiling point range of from about 280° C. to about 290° C. at a pressure in the range of from about 1 mm to about 2 mm of mercury, an acid value in the range of from about 150 to about 200 and an iodine value in the range of from about 50 to about 90.

4. The method of claim 1 wherein the step of reacting the reaction emulsion comprises maintaining the reaction emulsion at a temperature in the range of from about 0° C. to about 100° C. for a period of time in the range of from about 1 hour to about 20 hours.

5. The method of claim 4 wherein the temperature is maintained in the range of from about 5° C. to about 50° C.

6. The method of claim 1 wherein the olefinic monomeric compound is selected from the group consisting of styrene, butadiene and mixtures thereof.

7. The method of claim 1 wherein the olefinic monomeric compound is selected from the group consisting of styrene, butadiene, acrylonitrile and mixtures thereof.

8. The method of claim 1 wherein the olefinic monomeric compound is selected from the group consisting of styrene, butadiene, vinyl pyridine and mixtures thereof.

9. The method of claim 5 wherein the olefinic monomeric compound is selected from the group consisting of styrene, butadiene, acrylonitrile, vinyl pyridine, chloroprene, mixtures of styrene and butadiene, mixtures of acrylonitrile, styrene and butadiene and mixture of vinyl pyridine, styrene and butadiene.

* * * * *

UNITED STATES PATENT AND TRADEMARK OFFICE
CERTIFICATE OF CORRECTION

PATENT NO. : 5,756,619
DATED : May 26, 1998
INVENTOR(S) : Claude Frank Phillips, Jr.

It is certified that error appears in the above-identified patent and that said Letters Patent is hereby corrected as shown below:

Column 6, line 32, change "hTFA" to -- HTFA --

Signed and Sealed this

Eleventh Day of August 1998

Attest:

BRUCE LEHMAN

Attesting Officer     Commissioner of Patents and Trademarks

UNITED STATES PATENT AND TRADEMARK OFFICE
CERTIFICATE OF CORRECTION

Patent No : 5,756,619

Dated : May 26, 1998

Inventor(s) : Phillips, Jr.

It is certified that error appears in the above-identified patent and that said Letters Patent is hereby corrected as shown below:

On the title page: Item [75] insert the following:

--[75] Inventors: Claude Frank Phillips, Jr., Lynn Haven, Fla., and Alexander J. Conte, Panama City Beach, Fla.--

Item ]19] after "Jr." insert --et al--.

Signed and Sealed this

First Day of February, 2000

*Attest:*

*Attesting Officer*

Q. TODD DICKINSON

*Acting Commissioner of Patents and Trademarks*